United States Patent [19]

Robello et al.

[11] Patent Number: 5,029,979
[45] Date of Patent: Jul. 9, 1991

[54] OPTICAL ARTICLE EXHIBITING A HIGH LEVEL OF SECOND ORDER POLARIZATION SUSCEPTIBILITY

[75] Inventors: Douglas R. Robello, Webster; Robert J. Perry, Pittsford; Edward J. Urankar; Jay S. Schildkraut, both of Rochester, all of N.Y.

[73] Assignee: Eastman Kodak Company, Rochester, N.Y.

[21] Appl. No.: 544,460

[22] Filed: Jun. 27, 1990

[51] Int. Cl.$^5$ .............................................. G02B 6/00
[52] U.S. Cl. .............................................. 350/96.34
[58] Field of Search .......................... 350/96.34, 96.15

[56] References Cited

U.S. PATENT DOCUMENTS 4,796,971  1/1989  Robello et al. ............... 350/96.34
4,900,127  2/1990  Robello et al. ............... 350/96.34

Primary Examiner—William L. Sikes
Assistant Examiner—Robert E. Wise
Attorney, Agent, or Firm—Carl O. Thomas

[57] ABSTRACT

An optical article is disclosed containing, for the transmission of electromagnetic radiation, a medium exhibiting a high second order polarization susceptibility containing a vinyl polymer having backbone pendant carbocyclic aromatic groups susbstituted with polar aligned noncentrosymmetric organic molecular dipoles. The molecular dipoles are linked to greater than 60 percent of the backbone pendant carbocyclic aromatic rings through an ester or amide linkage, so that said medium exhibits a second order polarization susceptibility of greater than $10^{-9}$ electrostatic units and a glass transition temperature in excess of 150° C.

20 Claims, 2 Drawing Sheets

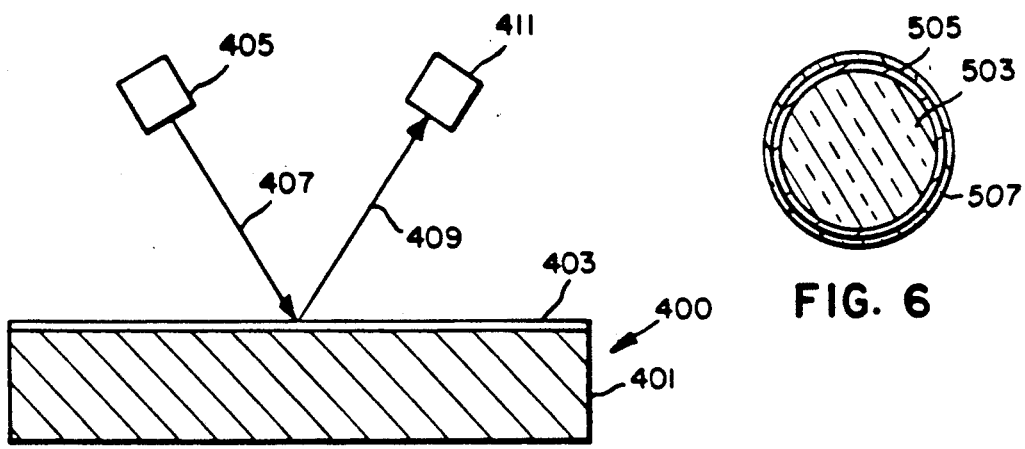
FIG. 4
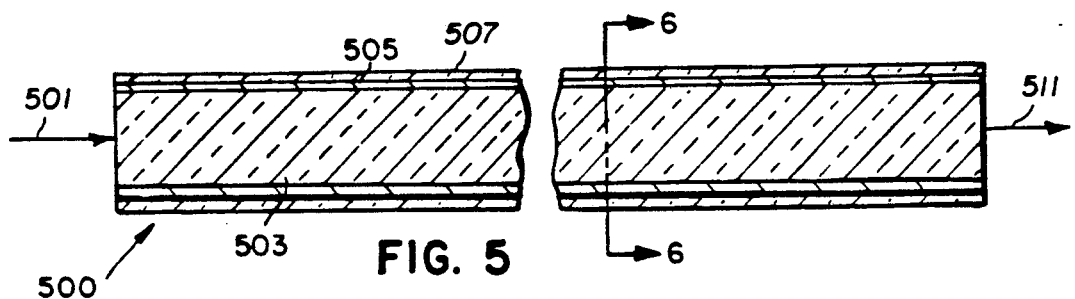
FIG. 5
FIG. 6
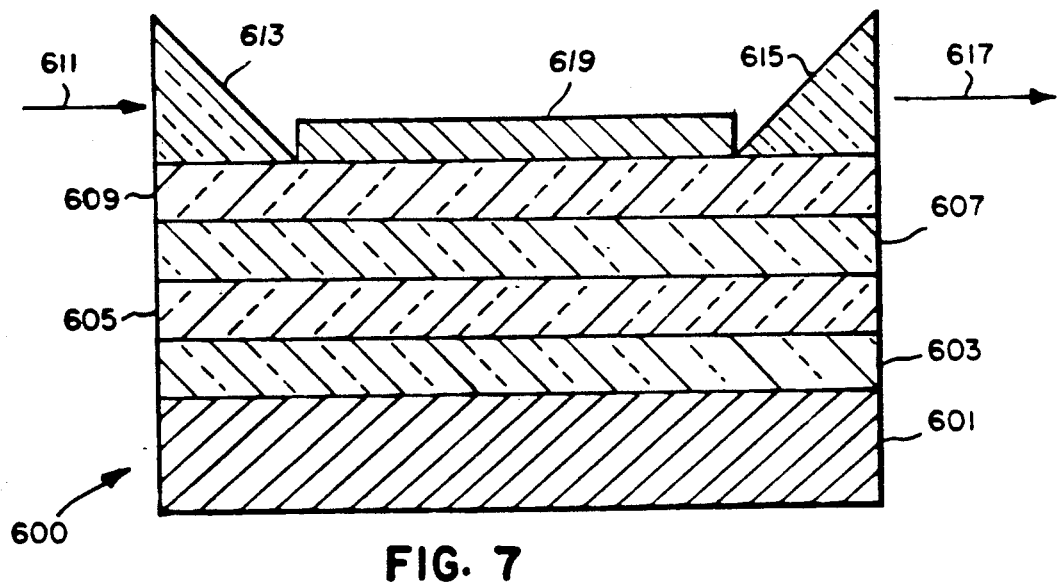
FIG. 7

OPTICAL ARTICLE EXHIBITING A HIGH LEVEL OF SECOND ORDER POLARIZATION SUSCEPTIBILITY

FIELD OF THE INVENTION

The invention relates to optical articles, particularly articles which exhibit effects attributable to the polarization of electromagnetic radiation. The invention relates specifically to optical articles which exhibit effects attributable to the nonlinear polarization of electromagnetic radiation during transmission through an organic medium.

BACKGROUND OF THE INVENTION

The significant polarization components of a medium produced by contact with an electric field are first order polarization (linear polarization), second order polarization (first nonlinear polarization), and third order polarization (second nonlinear polarization). On a molecular level this can be expressed by Equation 1:

$$P = \alpha E + \beta E^2 + \gamma E^3 \ldots \quad (1)$$

where
P is the total induced polarization,
E is the local electric field created by electromagnetic radiation, and
$\alpha$, $\beta$, and $\gamma$ are the first, second, and third order polarizabilities, each of which is a function of molecular properties.

$\beta$ and $\gamma$ are also referred to as first and second hyperpolarizabilities, respectively. The molecular level terms of Equation 1 are first order or linear polarization $\alpha E$, second order or first nonlinear polarization $\beta E^2$, and third order or second nonlinear polarization $\gamma E^3$.

On a macromolecular level corresponding relationships can be expressed by Equation 2:

$$P = \chi^{(1)} E + \chi^{(2)} E^2 + \chi^{(3)} E^3 \ldots \quad (2)$$

where
P is the total induced polarization,
E is the local electric field created by electromagnetic radiation, and
$\chi^{(1)}$, $\chi^{(2)}$, and $\chi^{(3)}$ are the first, second, and third order polarization susceptibilities of the electromagnetic wave transmission medium.

$\chi^{(2)}$ and $\chi^{(3)}$ are also referred to as the first and second nonlinear polarization susceptibilities, respectively, of the transmission medium. The macromolecular level terms of Equation 2 are first order or linear polarization $\chi^{(1)}E$, second order or first nonlinear polarization $\chi^{(2)}E^2$, and third order or second nonlinear polarization $\chi^3 E^3$.

To achieve on a macromolecular level second order polarization ($\chi^{(2)}E^2$) of any significant magnitude, it is essential that the transmission medium exhibit second order (first nonlinear) polarization susceptibilities, $\chi^{(2)}$, greater than $10^{-9}$ electrostatic units (esu). To realize such values of $\chi^{(2)}$ it is necessary that the first hyperpolarizability $\beta$ be greater than $10^{-30}$ esu.

What is required in a practical sense to build optical articles containing an organic transmission medium that exhibits a high (i.e., greater than $10^{-9}$ esu) second order polarization susceptibility are a combination of features. First, organic molecular dipoles are required that exhibit high ($>10^{-30}$ esu) hyperpolarizability. A variety of efficient organic molecular dipoles are known. They include an electron donor moiety linked to an electron acceptor moiety through a conjugated $\pi$ bonding system to permit oscillation of the molecular dipole between a lower polarity ground state and a higher polarity excited state. Although improvements in organic molecular dipoles are continuing, existing organic molecular dipole chromophores permit selection from a variety of adequate structures. Second, to translate the high hyperpolarizabilities of the molecular dipoles into a high ($>10^{-9}$ esu) second order polarization susceptibility transmission medium, it is necessary to achieve both a high density of the organic molecular dipoles in the transmission medium and a high degree of polar alignment of the organic molecular dipoles within the medium. Many otherwise promising materials have fallen short of practical needs in satisfying these requirements. Third, the transmission medium must be transparent to the wavelength or wavelengths of electromagnetic radiation to be transmitted.

In an attempt to meet these varied requirements the art has paid particular attention to attempting to attach organic molecular dipoles as pendant groups to the backbone of linear vinyl polymers. Linear vinyl polymers offer a variety of advantages in that they are generally transparent and have good rheological properties, being readily coated, usually from solution. Further, linear vinyl polymers with glass transition temperatures above ambient are available, allowing polar alignment of pendant molecular dipoles at elevated temperatures and cooling to room temperature to reduce the freedom of the pendant molecular dipoles to revert to random orientations.

Not withstanding the promise of linear vinyl polymers with pendant organic molecular dipoles in producing high $\chi^{(2)}$ transmission media for optical articles, a number of difficulties have been encountered. First, attempts to form organic molecular dipole substitutions of linear vinyl polymer repeating units have often been limited to a fraction of theoretically available sites. This has limited the density of organic molecular dipole incorporation and has a direct adverse effect on the $\chi^{(2)}$ of the transmission medium. Another difficulty has been that the organic molecular dipole substituted linear vinyl polymers have often exhibited low glass transition temperatures, which have allowed the molecular dipoles freedom of mobility from their desired polar aligned orientation. Still another difficulty has been lack of the desired degree of transparency in the visible (400 to 700 nm) region of the spectrum.

The difficulties encountered by the art can be appreciated by considering the shortcomings of attempts to form high second order polarization susceptibility transmission media by attaching organic molecular dipoles to polystyrene, reported by R-1 C. Ye, T. J. Marks, J. Yang and G. K. Wong, "Synthesis of Molecular Arrays with Nonlinear Optical Properties. Second Harmonic Generation by Covalently Functionalized Glassy Polymers", *Macromolecules*, Vol. 20, pp. 2322-2324, (1987) and R-2 C. Ye, T. J. Marks, J. Yang and G. K. Wong, "Synthesis Approaches to Stable and Efficient Polymeric Frequency Doubling Materials. Second-Order Nonlinear Optical Properties of Poled, Chromophore-Functionalized Glassy Polymers", *Nonlinear Optical Effects in Organic Polymers* (J. Messier et a. eds.), pp. 173-183, Kluwar Academic Publishers (1989).

In R-1 polystyrene was provided with an iodomethyl functional group in the para ring position that interacted with a thallium oxide functional group attached to an organic molecular dipole or a pyridinium ring of an organic molecular dipole to produce a linear vinyl polymer having pendant organic molecular dipoles covalently bonded through methylene linkages. R-1 states, "Most experiments have been carried out with polymers having 4.5-12.5% (by elemental analysis and NMR) of the benzene rings functionalized." That is, very low levels of organic molecular inclusion were achieved. This is revealed in terms of low values of $\chi^{(2)}$ (reported as $d_{33}$) only slightly exceeding $10^{-9}$ esu for the thallium prepared polymer at the highest poling potential and generally an order of magnitude lower for the pyridinium containing molecular dipole polymer. Thus, the pyridinium molecular dipole containing polymer exhibited too low a $\chi^{(2)}$ value to permit practical use. The thallium prepared polymer suffered from the obvious toxicity risks associated with thallium compounds. Further, the resulting organic molecular dipole substituted polystyrene produced by the thallium procedure was objectionably colored (purple).

R-2 reports the attachment of the chromophores N-(4-nitrophenyl-L-prolinol), referred to as NPP, and 4-(4-nitrophenylaza-N-ethyl-2-hydroxyethyl)aniline, referred to as Disperse Red or DR, to polystyrene using two different attachment schemes. In Scheme I the chromophore is provided with a toluene sulfonate functional group and the styrene with a 4 ring position hydroxy substituent that interact to allow attachment through an oxy linkage. Scheme II is similar to that of R-1 above providing the chromophore with a hydroxy functional group that reacts with a chloromethyl 4 ring position substituent of the polystyrene to produce a methylene linkage. R-2 states that using the Scheme I oxy linkage organic molecular dipole attachment densities can be increased to 60 percent of the polystyrene repeating units (still well below desirable high levels of substitution), but in Table I no functionalization of greater than 50 percent is reported, with the lowest Scheme II functionalization reported being only 4.5 percent. Even at the highest reported level of poling the $\chi^{(2)}$ values were did not exceed a modest $1.8 \times 10^{-8}$ esu. A further problem is revealed in the reported poling temperatures of 80° and 110° C. These low poling temperatures are indicative of objectionably low $T_g$ polymers and lack of polar alignment stability at ambient temperatures. Finally, the films produced were objectionably colored. The films containing the NPP chromophore were yellow-orange while those containing the DR chromophore were purple.

SUMMARY OF THE INVENTION

It is the recognition of this invention that an optical article having an improved organic transmission medium, including both improved high second order polarization susceptibilities and high glass transition temperatures ($T_g$ in excess of 150° C.), can be realized by linking organic molecular dipoles to linear vinyl polymers having a pendant carbocyclic aromatic ring by a novel procedure and linkage. The novel linkage and linking procedure achieves the advantage of allowing more than 60 percent of the pendant carbocyclic aromatic rings to be substituted with organic molecular dipoles. In preferred forms of the invention any desired percent of the pendant carbocyclic aromatic rings ranging from 60 to 100 percent can be substituted with pendant organic molecular dipoles. Further, such materials have been produced with extremely low levels of absorption in the visible region of the spectrum.

In one aspect, this invention is directed to an optical article containing, for the transmission of electromagnetic radiation, a medium exhibiting a high second order polarization susceptibility containing a vinyl polymer having backbone pendant carbocyclic aromatic groups substituted with polar aligned noncentrosymmetric organic molecular dipoles having an electron donor moiety linked through a conjugated $\pi$ bonding system to an electron acceptor moiety to permit oscillation of the molecular dipole between a lower polarity ground state and a higher polarity excited state.

The vinyl polymers are characterized in that the molecular dipoles are linked to greater than 60 percent of said backbone pendant carbocyclic aromatic rings through an ester or amide linkage, so that the transmission medium exhibits a second order polarization susceptiblity of greater than $10^{-9}$ electrostatic units and a glass transition temperature in excess of 150° C.

BRIEF DESCRIPTION OF THE DRAWINGS

FIG. 4 is an alternative form of a second harmonic generating optical article.

FIG. 5 is an optical article for achieving parametric effects.

FIG. 6 is a section taken along section line 6—6 in FIG. 5.

FIG. 7 is an optical article for achieving parametric effects and phase shifting.

DESCRIPTION OF PREFERRED EMBODIMENTS

Figure 1:
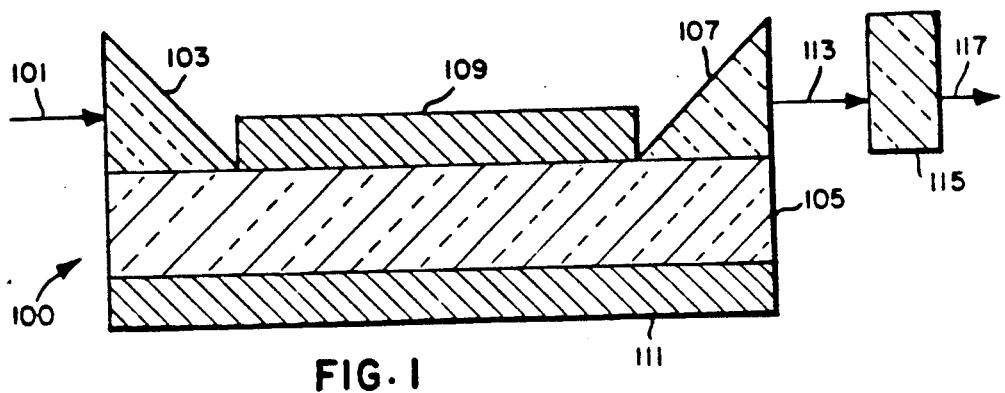
FIG. 1 is a second harmonic generating optical article.

The following are illustrative of optical articles satisfying the invention exhibiting effects attributable to second order polarization:

Referring to FIG. 1, the optical article 100 is capable of generating a second harmonic of electromagnetic radiation 101 supplied to it. Incoming electromagnetic radiation is introduced through input means 103, shown as a first prism, into an optically active transmission medium 105 which exhibits a high level ($>10^{-9}$ esu) second order or first nonlinear polarization susceptibility, hereinafter referred to simply as the optically active transmission medium according to the invention or, more succinctly, as the optically active transmission medium. Electromagnetic radiation is transmitted through the medium 105 to output means 107, shown as a second prism. In the simplest form of the optical article neither the input nor output prisms are required. Escape of electromagnetic radiation from the transmission medium can be minimized by locating optional cladding elements 109 and 111 above and below the transmission medium. The cladding elements can serve one or a combination of different functions. First, they provide physical protection for the optically active transmission medium. Second they can be used to control the wavefront distribution of transmitted radiation. When two cladding layers of the same refractive index are shown, a symmetrical wavefront distribution results. When the two cladding layers differ in their refractive indices or one of the two cladding layers, usually the upper cladding layer, an asymmetrical wavefront distribution exists. A third important function provided by cladding layers is to prevent direct contact of the optically active transmission medium with metallic layers, such as electrodes, and thereby reduce attenuation of electromagnetic radiation as it is being guided longitudinally through the device.

When the transmission medium is constructed according to the requirements of the invention, specifically described below, at least a portion of the electromagnetic radiation entering the transmission medium will be altered in frequency during its travel through the medium. More specifically, a second harmonic of the frequency will be generated. The electromagnetic radiation leaving the output means, indicated by arrow 113, exhibits both the original frequency of the input radiation and a second harmonic of this frequency. Although shown by a single arrow, the different radiation frequencies will exit from the prims 107 at divergent angles, and this divergence in exit paths can be relied upon for separation of the electromagnetic radiation into its separate wavelength components. Alternatively, the electromagnetic radiation retaining the original frequency can, if desired, be removed by passing the electromagnetic radiation leaving the article through a filter 115 capable of absorbing radiation of the original frequency while transmitting higher frequency (shorter wavelength) portions of the electromagnetic radiation. By employing one or a combination of filters any broad or narrow frequency band of electromagnetic radiation can be retained in the transmitted output electromagnetic radiation 117.

Figure 2:
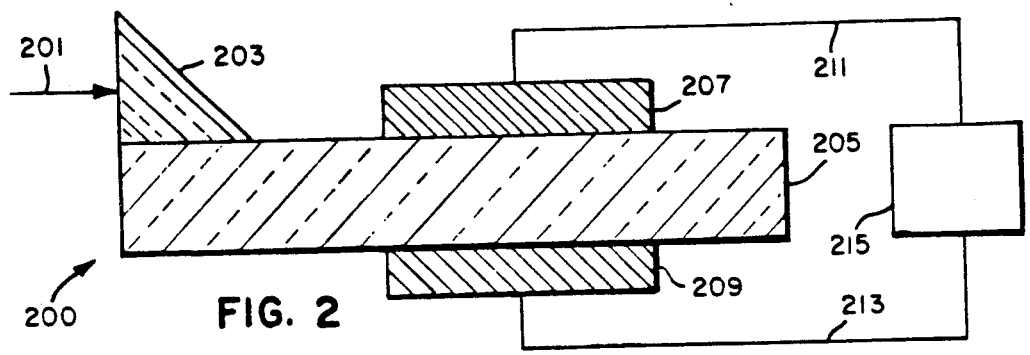
FIG. 2 is a DC signal providing optical article.

Referring to FIG. 2, an optical article 200 is shown capable of producing a DC potential when electromagnetic radiation 201 is supplied through input means 203, shown as a prism, to optically active transmission medium 205, which can be identical to medium 105, described above. When electromagnetic radiation is being transmitted through the medium a potential difference is produced between upper electrode 207 and lower electrode 209 in electrical contact with the upper and lower surfaces of the transmission medium. Electrical conductors 211 and 213 can be used to relay the potential of the upper and lower electrodes to an electronic response unit 215. The electronic response unit can in its simplest form be a unit that provides a digital response indicative of the the presence or absence of electromagnetic radiation in the transmission medium. Alternatively, the electronic response unit can provide an analog response indicative not only of the presence, but also the intensity of electromagnetic radiation in the transmission medium.

By modifying the optical article 200 to interpose cladding layers similar to those described above between the electrodes 207 and 209 and the optically active transmission medium an optical article is created that can be employed as a phase shifter. In this case an electrical potential is supplied from a source 215 through conductors 211 and 213 to electrodes 207 and 209, respectively. Electromagnetic radiation 201 from a beam splitter (not shown) is then fed to the device through the input means 203. The effect of the applied potential gradient on the electromagnetic radiation being guided through the optically active transmission medium is to cause light emerging from the optically active medium to be phase shifted as compared to a second portion of the electromagnetic radiation supplied from the beam splitter and guided through a transparent optically passive medium.

Figure 3:
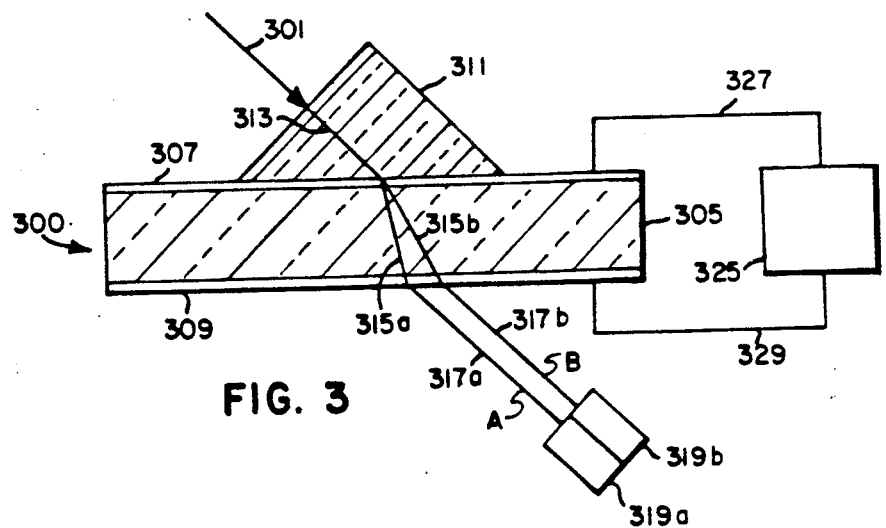
FIG. 3 is an electromagnetic beam displacement optical article.

Referring to FIG. 3, the optical article 300 is capable of physically displacing a beam 301 of electromagnetic radiation being transmitted through it as a function of the concurrent receipt of a DC bias. Optically active transmission medium 305, which can be identical to optically active medium 105 or 205, is provided with transparent upper and lower electrodes 307 and 309. The electrodes can, for example, be thin layers of a vacuum vapor deposited metal or metal oxide-e.g., indium tin oxide. An electromagnetic radiation input means, shown as prism 311, is located on the upper transparent electrode. The electromagnetic radiation passes through the prism as indicated by arrow 313. When the electromagnetic radiation enters the transmission medium, it follows either path 315a or path 315b. Depending upon which of the two alternative paths are followed, the first electromagnetic radiation either travels along path 317a or 317b upon emerging from the lower transparent electrode. The paths 315a and 317a together constitute an A path through the optical article while the paths 315b and 317b together constitute a B path through the optical article. Sensing units 319a and 319b are located to receive electromagnetic radiation traveling along the A and B paths, respectively. It is apparent that only one of the two sensing units is essential, since failure to sense electromagnetic radiation can be employed to indicate that the electromagnetic radiation has shifted to the alternate path.

Shifting of electromagnetic radiation between the A and B paths is achieved by supplying a DC bias to the upper and lower electrodes while transmission of the electromagnetic radiation through the optically active transmission medium is occurring. To accomplish the required DC bias a DC potential source is shown connected to the upper and lower electrodes by electrical conductors 327 and 329.

Application of the DC bias alters the refractive index of the transmission medium when it is formed of a material exhibiting a significant second order susceptibility. This causes the first electromagnetic radiation beam to be refracted at a different angle when the transmission medium is electrically biased, and this changes the first electromagnetic radiation path through the transmission medium. In some instances the refractive index of the transmission medium is increased by the electrical bias and in other instances lowered by the electrical bias, depending upon whether the molecular dipole contained within the transmission medium exhibits a positive or negative first hyperpolarizability $\beta$.

In FIG. 4 an optical article 400 is shown comprised of a reflective substrate 401 and an optically active transmission medium 403 according to the invention shown in the form of a layer. Electromagnetic radiation is supplied from a source 405 as indicated by arrow 407. The electromagnetic radiation traverses the optically active transmission medium, is reflected by the substrate, and traverses the optically active transmission medium a second time. Electromagnetic radiation leaving the optically active transmission medium is indicated by arrow 409. A sensor 411 which is responsive to the second harmonic of the input electromagnetic radiation, but not radiation at the wavelength of the input radiation, is shown provided to receive electromagnetic radiation from the layer 403. Instead of employing a sensor that is selectively responsive to the second harmonic wavelength, separation of the fundamental and second harmonic wavelengths can be undertaken as described above in connection with FIG. 1. The thinner the layer of the optically active transmission medium, the higher the intensity of the input electromagnetic radiation must be in order to achieve a given output of second harmonic radiation. In the limiting case the optically active transmission medium can be a monomolecular oriented molecular dipole layer.

In FIGS. 5 and 6 an optical article 500 according to the invention is shown capable of inducing parametric effects, such as second harmonic generation, by acting on input electromagnetic radiation, indicated by arrow 501. To achieve alteration of the input radiation a transparent optical waveguide 503 of any conventional type is provided having on its external surface a layer of an optically active transmission medium 505 according to the invention, which can have the same properties as the medium 105, described above. The optical waveguide 503 is normally optically passive—that is, exhibits no significant levels of nonlinear (second or third order) polarization. Concentrically surrounding the optically active transmission medium 505 is a cladding layer 507. The waveguide 503 and the cladding layer 507 each have a lower refractive index than the optically active transmission medium 505.

As the input electromagnetic radiation 501 traverses the waveguide 503, a portion of the radiation will impinge on the surrounding layer of the optically active transmission medium 505 and be refracted back into the waveguide. Successive impingements of transmitted radiation on the optically active medium result in measurable parametric effects, such as second harmonic generation. The cladding layer 507 performs the function of the cladding layers described in FIG. 1.

In FIG. 7 an optical article 600 is shown capable of producing useful parametric effects similarly as optical article 500, but exhibiting a greater capability for better phase matching, such as that desired for improved efficiency second harmonic generation. A substrate 601 is shown supporting superimposed waveguide layers 603, 605, 607, and 609. While four superimposed layers are shown, in practice any odd or even number of superimposed layers can be provided. The odd layers (603 and 607) in the sequence can be formed of an optically active transmission medium according to the invention (similarly as medium 105) while the even layers (605 and 609) can be formed of a passive or linear optical medium, as described above. Alternatively, the optically active and passive transmission media layers can be reversed in order. In either instance, but particularly in the latter, an option cladding layer 619 similar to cladding layers of FIG. 1 can be provided.

To achieve useful parametric effects, electromagnetic radiation, indicated by arrow 611 is supplied to the waveguiding layers through input means 613, shown as a prism. In passing through the waveguiding layers to output means 615, shown as a prism, the optically active and passive media layers together alter the form of the electromagnetic radiation, indicated by output arrow 617, so that parametric (e.g., second harmonic) effects are more efficiently generated.

The optical article constructions described above are exemplary of a large variety of possible differing optical article constructions. The present invention is compatible with any conventional construction of an optical article relying on a significant second order polarization susceptibility to produce a useful effect. An essential component of each of the optical articles of this invention is an optically active transmission medium exhibiting a second order polarization susceptibility greater than $10^{-9}$ (preferably greater than $5 \times 10^{-8}$) electrostatic units (esu).

It has been discovered that improved optical articles according to this invention can be realized when the medium for the transmission of electromagnetic radiation is comprised of a vinyl polymer having backbone pendant carbocyclic aromatic rings which are at least 60 percent, preferably at least 80 percent and optimally at least 90 percent, substituted with organic molecular dipoles. Organic molecular dipole substitutions of up to 100 percent of the pendant carbocyclic aromatic rings are specifically contemplated. For most applications performance improvements follow directly from increasing levels of organic molecular dipole substitution. Because of their high degree of organic molecular dipole substitution these polymers exhibit second order polarization susceptibilities in excess of the above-stated minimum operative and preferred values.

The polymers contemplated for use in the optical articles of this invention are linear (i.e., noncross-linked) vinyl polymers having backbone pendant carbocyclic aromatic groups substituted with polar aligned noncentrosymmetric organic molecular dipoles. The molecular dipoles are linked to the pendant carbocyclic aromatic rings through an ester or amide linkage.

Because of their structure, these polymers exhibit glass transition temperatures ideally suited to producing films having the polar aligned organic molecular dipole arrangements required for achieving and retaining at ambient temperatures high second order polarization susceptibilities. The polymers exhibit glass transition temperatures ranging from above 150° C. up to about 200° C. and, in preferred forms, from about 150° C. to 180° C. Having a glass transition in excess of 150° C. is a significant advantage in that, when the polymer is cooled to ambient temperatures following poling, the organic molecular dipoles are immobilized in their polar aligned arrangement essential to achieving high $\chi^{(2)}$ values. Whereas, with polymers having lower glass transition temperatures, though above ambient, relaxation of organic molecular dipole polar alignment is frequently observed. By having glass transition temperatures up to about 200° C., preferably in the range of from 150° to 180° C., the risk of thermal degradation of the polymer on heating is avoided.

The particularly advantageous combination of high organic molecular dipole attachment density and optimum glass transition temperature ranges is made possible by the combination of the vinyl polymer backbone, the pendant carbocyclic aromatic ring structure, and, particularly, the ester and amide linkages to the pendant aromatic rings.

The pendant groups primarily responsible for the advantageous properties of the polymers can be generally represented in their entirety (that is, from their point of attachment to the backbone carbon atom of the vinyl polymer) by the formula:

$$-\text{Ar}-\text{C(O)X}-\text{L}-\text{MD} \tag{I}$$

where
  Ar represents a divalent carbocyclic aromatic group;
  C(O)X represents a divalent ester or amido linking group;
  L represents a divalent linking group; and MD represents a noncentrosymmetric organic molecular dipole.

The divalent carbocyclic aromatic group attached to the backbone carbon atom can take any form conventionally found in vinyl polymers. Divalent carbocyclic aromatic groups having 6 ring carbon atoms (e.g., phenylene groups) are preferred, although carbocyclic aromatic groups having up to 12 carbon atoms (e.g., biphenylene) are contemplated.

The pendant groups of formula (I) are formed by starting with pendant groups attached to the backbone carbon atoms satisfying the formula:

$$-Ar-Y \quad \quad \quad (II)$$

where
  Ar is a defined above and
  Y is a convenient leaving group—e.g., bromide, iodide, triflate ($-SO_3CF_3$), etc.

The formula (II) pendant groups of the starting vinyl polymer are then reacted in the presence of a based and a suitable solvent (e.g., dimethylacetamide, tetrahydrofuran, toluene, etc.) and a transition metal catalyst, such as a palladium catalyst, with carbon monoxide and a compound satisfying the formula:

$$HX-L-MD \quad \quad \quad (III)$$

where
  X is a divalent oxy or imino moiety—e.g., —O— or —N(R)—, where R is hydrogen or alkyl of from 1 to 3 carbon atoms.

The leaving group Y of formula (II) and the hydrogen (H) of formula (III) are displaced with the carbon monoxide forming the carbonyl, —C(O)—, moiety of formula (I) which forms the immediate attachment between the starting vinyl polymer and the remainder of the pendant group. The by-product HY is neutralized by the base present during its formation.

The divalent linking group L performs two distinct functions. First, it provides a stable linkage between X and MD and, second, it is chosen to allow MD freedom of alignment during poling. With these criteria in mind, a broad range of suitable linking groups are available for selection. Virtually any relatively unreactive, nonrigid linkage is capable of satisfying these requirements. To allow steric freedom to the molecular dipole the linking group preferably provides at least a two carbon atom separation between X and MD. To avoid unnecessary bulk the linking group is preferably limited to about 14 carbon atoms in total. Divalent hydrocarbon and ether linkages are specifically contemplated. While other selections of linking groups are possible, a preferred class of synthetically convenient linking groups can be represented by the formula:

$$-L^1-(-O-L^2-)_m-L^3- \quad \quad \quad (IV)$$

where
  $L^1$ represents alkyl, aryl or alkaryl;
  $L^2$ and $L^3$ represent alkyl; and
  m represents an integer of from zero to 3.

The organic molecular dipoles can be selected from a those known in the art known to exhibit a first hyperpolarizability ($\beta$) in excess of $10^{-30}$ esu. Organic molecular dipoles can be generally represented by the formulae:

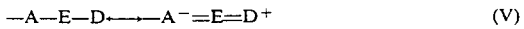
$$-A-E-D \longleftrightarrow -A^-=E=D^+ \quad \quad \quad (V)$$

or

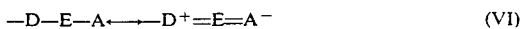
$$-D-E-A \longleftrightarrow -D^+=E=A^- \quad \quad \quad (VI)$$

where
  A represents a electron acceptor moiety;
  D represents an electron donor moiety; and
  E represents a conjugated $\pi$ bonding system.

From the formulae it is apparent that it is immaterial whether organic molecular dipoles are linked to the vinyl polymer through the electron acceptor moiety or the electron donor moiety. It is, in fact, possible, though generally not preferred, to provide mixtures of similarly or oppositely linked organic molecular dipoles present in the transmission medium or even within a single polymer.

Contemplated electron acceptor moieties include acyl, cyano, nitro, and sulfonyl groups. Generally, the more electronegative electron acceptor moieties are preferred, such as halogen substituted sulfonyl groups, particularly those that are di- or trihalo-substituted on the $\alpha$ carbon atom attached to the sulfonyl group, such as trifluoromethylsulfonyl, difluoromethylsulfonyl and difluoromethylenesulfonyl. Of these electron acceptor moieties only the sulfonyl and acyl moieties have sites available for attachment to the divalent linking group L.

Contemplated electron donor moieties include oxy (—O—), thio (—S—) and imino —N(R$^1$)—, where R$^1$ is hydrogen or alkyl of from 1 to 6 carbon atoms. When the molecular dipole is attached to the vinyl polymer backbone through its electron donor moiety, one of the oxy, thio and imino moiety bonds is to the divalent linking group L, with the remaining bond being to the conjugated $\pi$ bonding system E. When the molecular dipole is attached to the vinyl polymer backbone through the electron acceptor moiety, the electron donor moiety satisfies the formula:

$$-X^1-R^1 \quad \quad \quad (VII)$$

$X^1$ is an oxy (—O—), thio (—S—) or imino —N(R$^1$)—moiety and
$R^1$ and $R^2$ are each hydrogen or alkyl of from 1 to 6 carbon atoms, but preferably both alkyl.

A wide variety of conjugated $\pi$ bonding systems satisfying the requirements of E are known to the art and readily applied to the practice of the invention. Preferred conjugated $\pi$ bonding systems are those disclosed by Ulman et al U.S. Pat. No. 4,792,208, Scozzafava et al U.S. Pat. No. 4,886,339, and Robello et al U.S. Pat. No. 4,796,971, the disclosures of which are here incorporated by reference. While a conjugated $\pi$ bonding system can range in simplicity from a mere vinyl (—CH=CH—) group to extended aromatic and aliphatic conjugations, preferred conjugated $\pi$ bonding systems are provided by 4,4'-stilbene and 4,4'-azobenzene bonding systems. These conjugated $\pi$ bonding systems provide an attractive balance of synthetic convenience, large dipole moments and high resonance efficiencies.

In the synthesis of a number of conventional vinyl polymers containing molecular dipoles as pendant groups a difficulty has been encountered in that if more than about one third of the repeating units of the vinyl polymer are substituted with organic molecular dipoles, the resulting polymer often lacks sufficient solubility for efficient coating. This problem is discussed, for example, by Robello et al U.S. Pat. No. 4,900,127. The difficulty has been attributed to reactions between vinyl groups in adjacent organic molecular dipoles. It is an advantage of this invention that no unwanted interactions between adjacent molecular dipoles have been detected, even when all of the repeating units of the vinyl polymer have been provided with pendant organic molecular dipoles. Quite unexpectedly, comparable performance can be achieved with high loading levels of organic molecular dipoles containing either a 4,4'-stilbene (a vinyl group containing linkage) or a 4,4'-azobenzene (a linkage lacking a vinyl group).

A convenient and preferred class of vinyl polymer starting materials are leaving group (i.e., group Y, discussed above) substituted homopolymers of polystyrenes, including polystyrene—i.e., poly(vinylbenzene) and poly(alkylstyrenes). The term "alkylstyrene" is employed in its art recognized usage to indicate a styrene that has been substituted at one or more of its $\alpha$ carbon atom and ring positions with an alkyl group, typically of from 1 to 3 carbon atoms. When all of the leaving groups are displaced to produce pendant groups satisfying formula (I) above, the result is a homopolymer. It is, of course, possible to displace leaving groups from only 60 percent of the repeating units, thereby producing a copolymer containing pendant groups satisfying each of formula (I) and (II) in a ratio of 1.0 to 0.6 of (I) to 0 to 0.4 of (II).

While the invention is preferably practiced using homopolymers of polystyrenes as starting materials, it is appreciated that other common vinyl polymer repeating units can be incorporated. To achieve the high levels of molecular dipole attachment and thereby realize the full advantages of the invention, it is preferred that no more than 40 percent of the repeating units of the vinyl polymer selected be incapable of forming pendant groups satisfying formula (I) above. Other repeating units can be included for optimizing final or intermediate chemical and physical properties for specific applications, but are not required.

The vinyl polymers containing pendant organic molecular dipoles contemplated for incorporation in the optical articles of this invention can be employed within the wide range of molecular weights known to be useful in forming films. Number average molecular weights in the range of from 5000 to 500,000 are contemplated, with preferred number average molecular weights being in the range of from about 10,000 to 300,000. A molecular weight determination procedure of this type is described in detail in "Modern Size Exclusion Chromatography", W. W. Yau, J. J. Kirkland, and D. D. Bly, Wiley Interscience, J. Wiley and Sons, 1979.

EXAMPLES

The invention can be better appreciated by reference to the following specific embodiments:

EXAMPLE 1

4-(2-Acetoxyethoxy)benzaldehyde

To a stirred solution of sodium hydride (10.0 g, 0.25 mol) suspended in 100 mL of dry dimethyl sulfoxide (DMSO), under nitrogen, were added 31 g of 4-hydroxybenzaldehyde (0.25 mol) in 50 mL of DMSO. The solution was stirred for 15 min and then 31.3 g of bromoethanol (0.25 mol) were added and the reaction was heated at 80° C. for 24 hr. The mixture was then poured into ca. 200 g of ice water and the crude oil was extracted with 100 mL of dichloromethane. The water was twice extracted with dichloromethane (2×75 mL). The organic layers were combined, dried with sodium sulfate and evaporated under reduced pressure. The crude product, 4-(2-hydroxyethoxy)benzaldehyde, was used in the next step without further purification.

A mixture of the crude 4-(2-hydroxyethoxy)benzaldehyde (30 g, 0.18 mol) and acetic anhydride (40 g, 0.40 mol) was dissolved in 125 mL of dry pyridine and heated at reflux for 3 hr, after which time the reaction mixture was poured onto ca. 200 g of crushed ice. The crude oil was taken up into 150 mL of dichloromethane and washed twice with 5% HCl (2×75 mL) and once with brine (1×75 mL). The organic layer was then dried with sodium sulfate and the solvent was removed under reduced pressure. The crude residue was distilled at 148° C. (1×10$^{-3}$ mm) to give 12.9 g (25% overall yield) of a slightly cloudy liquid.

H$^1$ NMR($\delta$, ppm): 2.02 (s, 3H); 4.19 (t, 2H); 4.38 (t, 2H); 7.35 (AB, J$_{AB}$=8.7 Hz, $\Delta\nu$=243.5 Hz, 4H), 9.80 (s, 1H).

EXAMPLE 2

4'-(2-Acetoxyethoxy)-4-methylsulfonylstilbene

To a stirred suspension of 3.0 g (0.075 mol) of 60% sodium hydride dispersion, 11.0 g (0.05 mol) of 4-(2-acetoxyethoxy)benzaldehyde (Example 1) and 125 mL of dry 1,2-dimethoxyethane were added, under nitrogen, 13.9 g (0.05 mol) of dimethyl 4-methylsulfonylbenzylphosphonate. The mixture was heated at reflux for 2 hr, after which time it was cooled and poured over ca. 200 g of crushed ice under nitrogen. The crude product was filtered, washed with water and air-dried to give 17.7 g (98%) of the white solid, which was used without further purification. m.p.=175°-177° C.

H$^1$ NMR($\delta$, ppm): 2.09 (s, 3H); 3.05 (s, 3H); 4.19 (t, 2H); 4.43 (t, 2H); 7.06 (AB, J$_{AB}$=8.7 Hz, $\Delta\nu$=165.9 Hz, 4H); 7.08 (AB, J$_{AB}$=16.3 Hz, $\Delta\nu$=61.1 Hz, 2H); 7.75 (AB, J$_{AB}$=8.4 Hz, $\Delta\nu$=77.5 Hz, 4H).

EXAMPLE 3

4'-(2-Hydroxyethoxy)-4-methylsulfonylstilbene

4'-(2-Acetoxyethoxy)-4-methylsulfonylstilbene (17 g, 0.05 mol, Example 2) was dissolved in a mixture of 125 mL of ethanol, 25 mL of 1,4-dioxane and 4.2 mL of concentrated HCl, and heated at reflux overnight. While heating, water was added to the reaction mixture to near precipitation and the solution was cooled. The precipitate was filtered, washed with water and dried in vacuum to give 12.3 g (77%) of the white product. m.p.=224°-226° C.

H$^1$ NMR($\delta$, ppm): 3.70 (m, 2H); 3.99 (t, 2H); 4.86 (t, 1H), 7.26 (AB, J$_{AB}$=8.6 Hz, $\Delta\nu$= 183.6 Hz, 4H); 7.28 (Ab ,J$_{Ab}$=16.4 Hz, $\Delta\nu$=64.7 Hz, 2H); 7.82 (Ab ,J$_{AB}$=8.4Hz, $\Delta\nu$=$\nu$=24.3 Hz, 4H).

EXAMPLE 4

N-(2-Acetoxyethyl)-N-methylaniline

A solution of 74.0 g (0.489 mol) of N-(2-hydroxyethyl)-N-methylaniline in 100 mL of pyridine was treated dropwise with 55 g (0.54 mol) of acetic anhydride. The resulting mixture was heated at reflux for 10 hr, then cooled and poured onto 500 g of ice. The mixture was extracted three times with dichloromethane (3×100 mL), the combined extracts were dried using magnesium sulfate (MgSO$_4$) and the solvent was evaporated. The residue was distilled at reduced pressure, producing 84.2 g of a slightly yellow oil, b.p. 107°–116° C. (0.4 mm).

EXAMPLE 5

4-[(2-Acetoxyethyl)methylamino]benzaldehyde

N-N-dimethylformamide (DMF, 200 mL) was cooled to 0° C. and treated dropwise with 73.3 g (0.478 mol) of phosphorus oxychloride. The resulting orange solution was stirred at 0° C. for 1 hr; then 84.0 g of N-(2-acetoxyethyl)-N-methylaniline (Example 4) were added slowly. The resulting mixture was heated at 80° C. for 10 hr, then cooled and poured onto 500 g of ice. The mixture was extracted with dichloromethane (3×300 mL), and the combined extracts were twice washed with water (2×300 mL). The dichloromethane solution was dried (MgSO$_4$) and concentrated. The residue was distilled at reduced pressure, producing 65.6 g (68%) of a gold oil, b.p. 190°–212° C. (0.06 mm).

EXAMPLE 6

4'-[(2-Hydroxyethyl)methylamino]-4-methylsulfonylstilbene

A solution of dimethyl 4-methylsulfonylbenzylphosphonate prepared as described in Ulman et al U.S. Pat. No. 4,792,208 (6.29 g, 22.6 mmol), 60% sodium hydride dispersion (1.35 g, 33.9 mmol) and 50 mL of dry 1,2-dimethoxyethane (DME) under nitrogen was treated with a solution of 4-[(2-acetoxyethyl)methylamino]benzaldehyde (5.00 g, 22.6 mmol, Example 5) in 50 mL of DME. The resulting mixture was heated at reflux for 16 hr, then cooled and poured onto 300 g of ice. The resulting yellow solid was filtered, washed with water and air-dried. The solid was heated at reflux in a mixture of 10 g of NaOH, 90 mL of ethanol and 90 mL of water for 24 hr, then cooled and poured onto 200 mL of water. The resulting brown solid was filtered and air-dried. The product was recrystallized twice from a mixture of ethanol and pyridine to produce 4.46 g (60%) of yellow plates, m.p. 201°–204° C.

$^1$H NMR (300 MHz, (CD$_3$($_2$SO) δ 2.96 (s, 3H), 3.19 (s, 3H), 3.42 (m, 2H), 3.55 (m, 2H), 4.70 (t, J=5.3, 1H), 6.70 (d, J=8.7, 2H), 7.02 (d, J=16.4, 1H), 7.32 (d, J=16.4, 1H), 7.45 (d, J=8.6, 2H), 7.79 (AB, Δν=30.1, J=8.3, 4H). $^{13}$C{$^1$H} NMR (75.5 MHz, (CD$_3$)$_2$SO) δ 38.7, 43.7, 54.0, 58.1, 111.6, 121.1, 123.5, 126.1, 127.4, 128.3, 132.6, 137.8, 143.3, 149.4.

EXAMPLE 7

Poly(4-bromostyrene)

A solution of distilled 4-bromostyrene (28.7 g, 157 mmol) and 2,2-azobis(isobutyronitrile) (AIBN, 0.26 g, 1.6 mmol) in 100 mL of distilled chlorobenzene was degassed by standard freeze-thaw techniques under vacuum. The solution was heated under nitrogen at 60° C. for 24 hr, then cooled and poured into 700 mL of vigorously stirred methanol. The resulting white powder was collected, then twice reprecipitated from tetrahydrofuran (THF) into methanol. After filtration and drying in a vacuum oven at 100° C., 16.2 g (56%) of a white powder was obtained.

Anal. calc'd. for C$_8$H$_7$Br: C, 52.49; H, 3.85; Br, 43.6. Found: C, 52.02; H, 4.02; Br, 46.3. Size exclusion chromatography (THF, polystyrene stds.) gave the following number and weight average molecular weights: M$_n$=23,200; M$_w$=40,600.

EXAMPLE 8

Poly{4-[4-(2-carbonyloxyethyl)methylamino-4'-methylsulfonylstilbene]styrene}

An 85 g (3-oz) pressure reaction vessel containing a stir-bar and fitted with a pressure gauge, a pressure release valve, a gas inlet and a straight ball valve for degassing and sample withdrawl was charged with poly(4-bromostyrene) (3.50 g, 19.1 mmol), 4-[(2-hydroxyethyl)methylamino]4'-methylsulfonylstilbene (6.33 g, 19.1 mmol), bis(triphenylphosphine) palladium-(II) chloride (PdCl$_2$L$_2$) (402 mg, 0.57 mmol), triphenylphosphine (PPh$_3$)(300 mg, 1.14 mmol), 2,6-di-t-butyl-p-cresol (BHT)(45 mg, 0.2 mmol) and N,N-dimethyl acetamide (DMAc) (55 mL). The mixture was stirred and degassed three times with argon; then 1,8-diazabicyclo[5.4.0]undec-7-ene (DBU) (3.45 mL, 22.9 mmol) was added and the vessel pressurized to 651 kPa (95 psi) carbon monoxide (CO). The reaction mixture was then heated at 115° C. for 18 hr. After this time, the contents of the vessel were filtered through a filter aid and precipitated into reagent-grade methanol. The yellow solid was isolated by suction filtration and washed extensively with methanol and then air-dried. the isolated polymer was subjected to another precipitation from DMAc into methanol and then two precipitations from DMAc into distilled water with a final drying at 80° C. at 2 torr for 3 days to give 6.4 g (72%) substituted polymer. Anal. calc'd for C$_{27}$H$_{27}$NO$_4$S: C, 70.26; H, 5.90; N, 3.03; S, 6.94. Found: C, 69.70; H, 5.85; N, 2.99; S, 6.63; Br, 0.80. Based on sulfur analysis, there are 95.5% of the theoretical number of molecular dipole groups attached to the polymer. Based on residual bromine, there is a molecular dipole loading of 98.2%. Based on the ratio of aromatic protons to methyl protons in the $^1$H NMR spectrum, a molecular dipole loading of 100% was calculated. Tg=162° C. Size Exclusion Chromatography (SEC) in N,N-dimethylformamide (DMF) gave polystyrene equivalent average molecular weights of Mw=155,000; Mn=71,000.

EXAMPLE 9

Poly{4-[4-(2-carbonyloxyethoxy)-4'-methylsulfonylstilbene]styrene-co-4-bromostyrene}

In the manner described above, poly(4-bromostyrene) (3.50 g, 19.1 mmol), 4-(2-hydroxyethoxy)-4'-methylsulfonyl stilbene (5.78 g, 18.1 mmol), PdCl$_2$L$_2$ (402 mg, 0.57 mmol), PPh$_3$ (300 mg, 1.14 mmol), BHT (45 mg, 0.2 mmol), DMAc (55 mL) and DBU (3.45 mL, 22.9 mmol) were allowed to react for 6 hr at 115° C. at 655 kPa (95 psi) CO. The polymer was precipitated twice from DMAc into methanol and twice into distilled water. After drying at 110° C. at 2 torr for 3 days, 6.15 g (75%) white polymer was obtained. Anal. calc'd for C$_{26}$H$_{24}$O$_5$S: C, 69.62; H, 5.39; S, 7.15. Found: C, 68.13, H, 5.18; S, 6.39. Based on sulfur analysis, there are 89.4% of the theoretical number of molecular dipole groups attached to the polymer. Based on residual bromine, thre is a molecular dipole loading of 93.8%. SEC in DMF gave polystyrene equivalent average molecular weights of Mw=174,000; Mn=77,000.

EXAMPLE 10

An amount of 0.18 g of polymer of Example 8 was dissolved in 1.0 mL of N,N-dimethyl acetamide. An indium tin oxide-coated glass substrate was completely covered with the solution. In an atmosphere of argon, the substrate was spun at a rate of 500 rpm for 10 sec and then 2000 rpm for 1 min. The film was then baked at 154° C. and 25 mtorr overnight. The thickness of the film was estimated to be from 1 to 2 μm.

The film was poled at a temperature of 160° C. by corona-charging the surface to +275 volts with the indium tin oxide electrode grounded. The surface potential and temperature were maintained for 1 hr, after which the film was cooled to room temperature. After the film cooled, corona-charging was discontinued. Next, a gold electrode with an area of approximately 0.1 cm$^2$ was evaporated on the film.

The second-order polarization susceptibility, $\chi^{(2)}$, of the film was measured in the following manner: A 632.8-nm-wavelength laser beam was passed through the glass, indium tin oxide and film and reflected from the gold electrode at an angle of incidence of 68° (measured from an axis normal to the plane of the optically active layer). The beam was polarized at an angle of 45° with respect to the plane of incidence. The voltage-induced birefringence resulted in a relative shift Δ of the reflected radiation polarized in-the-plane and normal-to-the-plane of incidence. The phase shift was measured by passing the reflected light through a phase shifting waveplate and then a polarizer oriented at 90° with respect to the first polarizer. The intensity of light which passed through the second polarizer is related to Δ.

A 123.5-volt rms 1-kHz sinusoidal signal was applied to the gold with the indium tin oxide electrode grounded. The intensity of reflected light passing through the polarizer was modulated 1.42% rms at the same frequency as the applied voltage. From this it was estimated that $\chi^{(2)}$ of the film was approximately equal to $7.4 \times 10^{-8}$ esu.

The invention has been described in detail with particular reference to preferred embodiments thereof, but it will be understood that variations and modifications can be effected within the spirit and scope of the invention.

What is claimed is:

1. An optical article containing, for the transmission of electromagnetic radiation, a medium exhibiting a high second order polarization susceptibility containing a vinyl polymer having backbone pendant carbocyclic aromatic groups substituted with polar aligned noncentrosymmetric organic molecular dipoles having an electron donor moiety linked through a conjugated π bonding system to an electron acceptor moiety to permit oscillation of the molecular dipole between a lower polarity ground state and a higher polarity excited state, characterized in that said molecular dipoles are linked to greater than 60 percent of said backbone pendant carbocyclic aromatic rings through an ester or amide linkage, so that said medium exhibits a second order polarization susceptibility of greater than $10^{-9}$ electrostatic units and a glass transition temperature in excess of 150° C.

2. An optical article according to claim 1 further characterized in that means are provided for directing electromagnetic radiation to said transmission medium.

3. An optical article according to claim 1 further characterized in that means are provided for placing an electric field across said transmission medium.

4. An optical article according to claim 3 further characterized in that said biasing means includes at least one transparent electrode in contact with said transmission medium.

5. An optical article according to claim 1 further characterized in that said transmission medium lies in contact with a linear waveguide for electromagnetic radiation.

6. An optical article according to claim 1 further characterized in that said molecular dipoles are linked to greater than 80 percent of said backbone pendant carbocyclic aromatic rings.

7. An optical article according to claim 6 further characterized in that said molecular dipoles are linked to greater than 90 percent of said backbone pendant carbocyclic aromatic rings.

8. An optical article according to claim 1 further characterized in that said vinyl polymer is comprised of pendant groups each attached to a backbone carbon atom satisfying the formula:

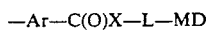

where
Ar represents a divalent carbocyclic aromatic group;
C(O)X represents a divalent ester or amido linking group;
L represents a divalent linking group; and
MD represents a noncentrosymmetric organic molecular dipole.

9. An optical article according to claim 8 further characterized in that Ar is a phenylene group.

10. An optical article according to claim 8 further characterized in that L contains from 2 to 14 carbon atoms and satisfies the formula:

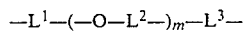

where
L$^1$ represents alkyl, aryl or alkaryl;
L$^2$ and L$^3$ represent alkyl; and
m represents an integer of from zero to 3.

11. An optical article according to claim 8 further characterized in that MD satisfies the formula:

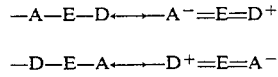

where
A represents a electron acceptor moiety;
D represents an electron donor moiety; and
E represents a conjugated π bonding system.

12. An optical article according to claim 11 further characterized in that the electron acceptor moiety is chosen from the group consisting of acyl, cyano, nitro, and sulfonyl.

13. An optical article according to claim 11 further characterized in that the electron donor moiety is chosen from the group consisting of —O—, —S— and —N(R$^1$)— moieties, where R$^1$ is hydrogen or alkyl of from 1 to 6 carbon atoms.

14. An optical article according to claim 11 further characterized in that E represents a stilbene or azobenzene linking group.

15. An optical article according to claim 8 further characterized in that Ar and the polymer backbone together form groups chosen from styryl and alkylstyryl groups, where the alkyl moiety contains from 1 to 3 carbon atoms.

16. An optical article according to claim 1 further characterized in that said vinyl polymer has a number average molecular weight in the range of from 5000 to 500,000.

17. An optical article according to claim 16 further characterized in that said vinyl polymer has a number average molecular weight in the range of from 10,000 to 300,000.

18. An optical article according to claim 1 further characterized in that said vinyl polymer has a glass transition temperature in the range of from greater than 150° C. up to 180° C.

19. An optical article according to claim 1 further characterized in that at least 60 percent of the repeating units forming the vinyl polymer are styryl or alkylstyryl groups each substituted with said molecular dipole through said ester or amide linkage.

20. An optical article according to claim 19 further characterized in that vinyl polymer is a styrene homopolymer with each of its repeating units substituted with said molecular dipole through said ester or amide linkage.

* * * * *